United States Patent
Xu et al.

(10) Patent No.: US 10,942,274 B2
(45) Date of Patent: Mar. 9, 2021

(54) TIME OF FLIGHT AND PICTURE CAMERA

(71) Applicant: Microsoft Technology Licensing, LLC, Redmond, WA (US)

(72) Inventors: Zhanping Xu, Redmond, WA (US); Abdelrehim Ahmed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 378 days.

(21) Appl. No.: 15/950,518

(22) Filed: Apr. 11, 2018

(65) Prior Publication Data

US 2019/0317212 A1  Oct. 17, 2019

(51) Int. Cl.

| | |
|---|---|
| *G01C 3/08* | (2006.01) |
| *G01S 17/86* | (2020.01) |
| *H04N 5/33* | (2006.01) |
| *G01S 17/89* | (2020.01) |
| *G01S 17/32* | (2020.01) |
| *G01S 17/18* | (2020.01) |

(52) U.S. Cl.
CPC ............ *G01S 17/86* (2020.01); *G01S 17/18* (2020.01); *G01S 17/32* (2013.01); *G01S 17/89* (2013.01); *H04N 5/33* (2013.01)

(58) Field of Classification Search
CPC ........ G01S 17/894; G01S 17/86; G01S 17/32; G01S 17/10; G01S 17/18; G01S 17/89; G01S 7/4912; G01S 7/4866; H04N 5/33
USPC ...................................................... 356/5.01
See application file for complete search history.

(56) References Cited

U.S. PATENT DOCUMENTS

| | | |
|---|---|---|
| 4,864,395 A | 9/1989 | Tajima |
| 5,579,107 A | 11/1996 | Wright et al. |
| 5,581,345 A | 12/1996 | Oki et al. |
| 6,323,942 B1 | 11/2001 | Bamji |
| 6,515,740 B2 | 2/2003 | Bamji et al. |
| 6,580,496 B2 | 6/2003 | Bamji et al. |
| 6,697,010 B1 | 2/2004 | Lam |
| 6,906,793 B2 | 6/2005 | Bamji et al. |
| 7,589,316 B2 | 9/2009 | Dunki-Jacobs |
| 7,719,662 B2 | 5/2010 | Bamji et al. |
| 7,804,536 B2 | 9/2010 | Blerkom |
| 7,855,740 B2 | 12/2010 | Hamilton et al. |
| 8,134,637 B2 | 3/2012 | Rossbach et al. |
| 8,218,068 B2 | 7/2012 | Deever et al. |
| 8,355,565 B1 | 1/2013 | Yang et al. |
| 8,587,771 B2 | 11/2013 | Xu et al. |

(Continued)

FOREIGN PATENT DOCUMENTS

| | | |
|---|---|---|
| CN | 106600572 A | 4/2017 |
| EP | 2116864 A1 | 11/2009 |

(Continued)

OTHER PUBLICATIONS

Bleiweiss, et al., "Fusing Time-of-Flight Depth and Color for Real-Time Segmentation and Tracking", in Proceedings of DAGM Workshop on Dynamic 3D Imaging, Sep. 9, 2009, pp. 1-13.

(Continued)

*Primary Examiner* — Mark Hellner

(57) ABSTRACT

A range camera operable to provide a range image of a scene and a picture of the scene, based on non-visible light and visible light registered for features in the scene on a same photosensor.

20 Claims, 3 Drawing Sheets

(56) References Cited

U.S. PATENT DOCUMENTS

| | | | |
|---|---|---|---|
| 8,659,698 | B2 | 2/2014 | Blayvas et al. |
| 8,670,029 | B2 | 3/2014 | McEldowney |
| 9,030,528 | B2 | 5/2015 | Pesach et al. |
| 9,451,240 | B2 | 9/2016 | You et al. |
| 9,544,513 | B2 * | 1/2017 | Shin ............ H04N 13/257 |
| 9,580,496 | B2 | 2/2017 | Gearing |
| 9,667,944 | B2 * | 5/2017 | Park ............ G01S 17/08 |
| 9,741,761 | B2 | 8/2017 | Jiang et al. |
| 9,998,730 | B2 * | 6/2018 | Park ............ G01S 17/08 |
| 2007/0127009 | A1 | 6/2007 | Chen et al. |
| 2008/0068583 | A1 | 3/2008 | Hiraide |
| 2008/0180650 | A1 | 7/2008 | Lamesch |
| 2009/0237640 | A1 | 9/2009 | Krikorian et al. |
| 2010/0102366 | A1 | 4/2010 | Lee et al. |
| 2011/0292380 | A1 | 12/2011 | Bamji |
| 2012/0013887 | A1 | 1/2012 | Xu et al. |
| 2012/0154535 | A1 | 6/2012 | Yahav et al. |
| 2013/0010072 | A1 | 1/2013 | Kim et al. |
| 2013/0020463 | A1 | 1/2013 | Lee et al. |
| 2013/0147979 | A1 | 6/2013 | Mcmahon et al. |
| 2014/0098192 | A1 * | 4/2014 | Park ............ H04N 13/257 348/46 |
| 2014/0217474 | A1 | 8/2014 | Lee et al. |
| 2014/0293102 | A1 | 10/2014 | Vogelsang et al. |
| 2016/0240579 | A1 | 8/2016 | Sun et al. |
| 2017/0146657 | A1 | 5/2017 | Xu |

FOREIGN PATENT DOCUMENTS

| | | |
|---|---|---|
| EP | 2148514 A1 | 1/2010 |
| EP | 2157401 A1 | 2/2010 |
| EP | 2890125 A1 | 7/2015 |
| JP | H09269372 A | 10/1997 |
| JP | 2000517427 A | 3/1998 |
| JP | 2006214998 A | 8/2006 |
| JP | 2008164496 A | 7/2008 |
| JP | 2009063303 A | 3/2009 |
| WO | 0249367 A2 | 6/2002 |
| WO | 2013104718 A2 | 7/2013 |

OTHER PUBLICATIONS

Shibata, et al., "Visible and near-infrared image fusion based on visually salient area selection", in Proceedings of SPIE, Digital Photography XI, vol. 9404, Feb. 27, 2015, 6 Pages.

Szeliski, Richard, "Computer Vision: Algorithms and Applications", in Publication of Springer-Verlag London, Sep. 30, 2010, 874 Pages.

Teranaka, et al., "Single-Sensor RGB and NIR Image Acquisition: Toward Optimal Performance by Taking Account of CFA Pattern, Demosaicking, and Color Correction", in Proceedings of IS&T International Symposium on Electronic Imaging, Feb. 14, 2016, 6 Pages.

Yang, et al.,"Fusion of Active and Passive Sensors for Fast 3D Capture", in Proceedings of IEEE International Workshop on Multimedia Signal Processing, Oct. 4, 2010, 6 Pages.

"Office Action Issued in European patent Application No. 16806373. 3", dated Mar. 25, 2019, 7 Pages.

"International Search Report and Written Opinion Issued in PCT Application No. PCT/US2019/024161", dated Jun. 14, 2019, 13 Pages.

"Summons to attend Oral Proceedings Issued in European Patent Application No. 16806373.3", dated Jul. 24, 2019 , 8 Pages.

"Office Action Issued in Korean Patent Application No. 10-2013-7001077", dated May 16, 201, 4 Pages.

"Office Action Issued in European Patent Application No. 11807282. 6", dated Jul. 24, 2014, 4 Pages.

"Office Action Issued in European Patent Application No. 11807282. 6", dated Jan. 27, 2015, 4 Pages.

"Search Report Issued in European Patent Application No. 11807282. 6", dated Apr. 17, 2013, 8 Pages.

"Notice of Allowance Issued in U.S. Appl. No. 13/092,350", dated Jul. 12, 2013, 9 Pages.

"Final Office Action Issued in U.S. Appl. No. 14/950,313", dated May 17, 2018, 8 Pages.

"Non-Final Office Action Issued in U.S. Appl. No. 14/950,313", dated Nov. 3, 2017, 10 Pages.

"First Office Action and Search Report Issued in Chinese Patent Application No. 201110206379.8", dated Nov. 2, 2012, 9 Pages.

"Second Office Action Issued in Chinese Patent Application No. 201110206379.8", dated May 14, 2013, 8 Pages.

"Office Action Issued in Japanese Patent Application No. 2013-520728", dated Feb. 19, 2015, 7 Pages.

Henry, et al., "RGB-D mapping: Using Kinect-style Depth Cameras for Dense 3D Modeling of Indoor Environments", in International Journal of Robotic Research, vol. 31, Issue 5,, Apr. 2012, 28 Pages.

"International Search Report and Written Opinion Issued in PCT Application No. PCT/US2011/42643", dated Dec. 22, 2011, 8 Pages.

"International Preliminary Report on Patentability issued in PCT Application No. PCT/US2016/062381", dated Feb. 26, 2018, 8 Pages.

"International Search Report and Written Opinion Issued in PCT Application No. PCT/US2016/062381", dated Feb. 1, 2017, 12 Pages.

"Second Written opinion Issued in PCT Application No. PCT/US2016/062381", dated Jul. 18, 2017, 7 Pages.

Xu, et al., "Investigation of 3D-imaging Systems Based on Modulated Light and Optical RF-interferometry (ORFI)", in Publication of Shaker Verlag GmbH as dissertation submitted to the Department of Electrical Engineering and Computer Science, Dec. 21, 1998, 211 Pages.

Yang, et al., "Spatial-Depth Super Resolution for Range Images", in Proceedings of the IEEE Conference on Computer Vision and Pattern Recognition, Jun. 17, 2007, 8 Pages.

* cited by examiner

TIME OF FLIGHT AND PICTURE CAMERA

BACKGROUND

An active illumination range camera comprises a light source which the camera controls to transmit light to illuminate features in a scene that the camera images, and a photosensor having light sensitive pixels on which the camera registers light that the features reflect from the transmitted light back to the camera. The range camera processes reflected light from the features that pixels in the photosensor register to provide a range image of the scene comprising measures of distances to the features. In a time of flight (TOF) range camera the camera processes reflected light from a feature that a pixel registers to determine a round trip flight time, "$T_R$", of light from the camera to the feature and back to the camera and therefrom a distance "d" to the feature.

In a gated time of flight (GT-TOF) camera, the transmitted light comprises a series of light pulses. A feature in the scene reflects light from the transmitted light pulses back to the camera as a series of reflected light pulses that are incident on a pixel that images the feature. The GT-TOF camera gates ON the camera photosensor for a series of exposure periods to register and cross-correlate the reflected light pulses incident on the pixel with the exposure periods to determine $\tau_R$ and therefrom distance d to the feature. In a continuous wave time of flight (CW-TOF) camera the camera transmits a "continuous wave" of light modulated by a periodic function characterized by an angular modulation frequency "$\omega$" to illuminate the scene that the camera images. Light reflected from the transmitted light by a feature in the scene reaches a pixel that images the feature as a wave of reflected light modulated at frequency $\omega$ but retarded in phase relative to the transmitted light wave by a propagation phase delay, "$\varphi_d$", which is related to $t_R$ by an expression $\varphi_d = \omega \tau_R$. For each of a plurality of exposure periods the camera samples the reflected light wave incident on the pixel by cross-correlating the reflected light wave with a reference sampling signal. The sampling signal is modulated at frequency $\omega$ but offset relative to phase of the transmitted light wave by a different sampling phase offset for each exposure period. The camera uses the cross-correlations associated with the exposure periods to determine $\varphi_d$ and therefrom d for the feature.

Typically, the transmitted light is infrared (IR) light, and the pixels, hereinafter also referred to as "IR pixels", in the photosensor that provide distances to features in the scene are shielded from visible light by IR bandpass filters.

SUMMARY

An aspect of an embodiment of the disclosure relates to providing an active illumination TOF camera that provides in addition to a range image of a scene that the camera images with optionally IR light that the camera transmits, a "picture image" of the scene responsive to visible light from the scene. In an embodiment, a photosensor in the TOF camera comprises in addition to an array of IR pixels on which the camera images the IR light to determine distances to features in the scene and provide the range image, pixels, also referred to as "picture pixels", that are sensitive to visible light and are interspersed on the photosensor at known locations relative to the IR pixels. A processor in the TOF camera processes amounts of IR light that the IR pixels in the photosensor register and visible light from the scene that the picture pixels in the photosensor register to estimate intensities of visible light incident on the IR and picture pixels. The processor optionally uses the determined estimates to provide a picture image of the scene for which a visual light intensity is associated with each IR pixel as well as picture pixel located in a region of the photosensor used to generate the picture image. The picture image therefore benefits from an image resolution that substantially matches that provided by the pitch of pixels in the photosensor, agnostic as to whether they are IR or picture pixels. The picture image may therefore be considered to benefit from a "full resolution" that the spatial configuration of pixels provides.

In an embodiment the picture pixels are R (red), G (green), and B (blue) "color pixels", and the estimates of intensities of visible light incident on the pixels comprise estimates for intensities of R, G, and B light, and the picture image provided by the processor comprises a full resolution color picture of the scene. In an embodiment, the picture pixels are monochrome pixels, which register intensity of incident light substantially independent of color of the incident visible light. The estimates of intensities are gray value estimates and the picture image provided by the processor comprises a full resolution monochrome picture, also referred as a black- and white-picture of the scene.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

In the discussion below operation of a CW-TOF camera configured to acquire both a range image and a picture image of a scene in accordance with an embodiment of the disclosure is discussed with reference to FIG. 1. Features of a photosensor in the CW-TOF camera comprising both IR pixels for providing the range image and color pixels for providing the picture image are discussed with respect to FIG. 2. Procedures using image processing kernels to process frames of voltages acquired for the photosensor and provide the range and picture images are discussed with reference to FIG. 3.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one, or any combination of more than one of the items it conjoins.

Figure 1:
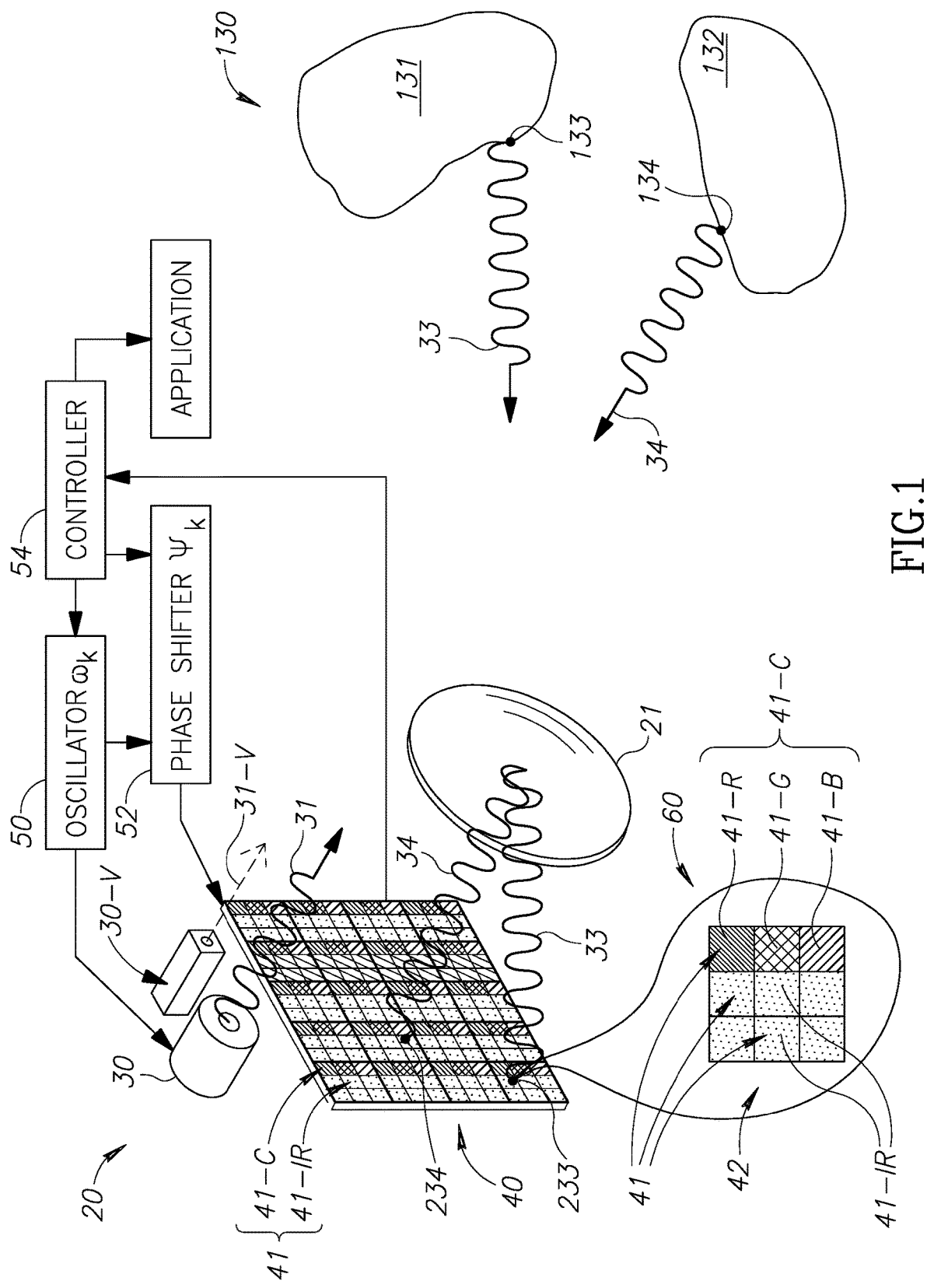
FIG. 1 schematically shows a CW-TOF camera acquiring a range image of a scene that provides distances to features in the scene, and a color picture of the scene, in accordance with an embodiment of the disclosure.

FIG. 1 schematically shows a CW-TOF camera 20 operating to acquire a range image of a scene 130, optionally including objects 131 and 132, that provides distances to features in the scene and a picture image of the scene that provides a visual image of the features. CW-TOF camera 20, which is represented very schematically, comprises an optical system represented by a lens 21, a light source 30 controllable to transmit, optionally IR, light to illuminate scene 130 and optionally a visible light source 30-V, which may be a white light source, controllable to illuminate scene 130 with visible, optionally white, light schematically represented by a dashed arrow 31-V. CW-TOF camera 20, also comprises a photosensor 40 on which optical system 21 images IR light reflected by features in scene 130 from the transmitted IR light and visible light from visible light source 30-V and ambient light that the features reflect. The CW-TOF camera comprises an oscillator 50 that provides a modulation frequency for modulating IR light that light source 30 transmits, a phase shifter 52 for providing sampling phase offsets for sampling IR light reflected by features in scene 130 back to the camera, and a controller 54 that controls components comprised in the CW-TOF camera.

Figure 2:
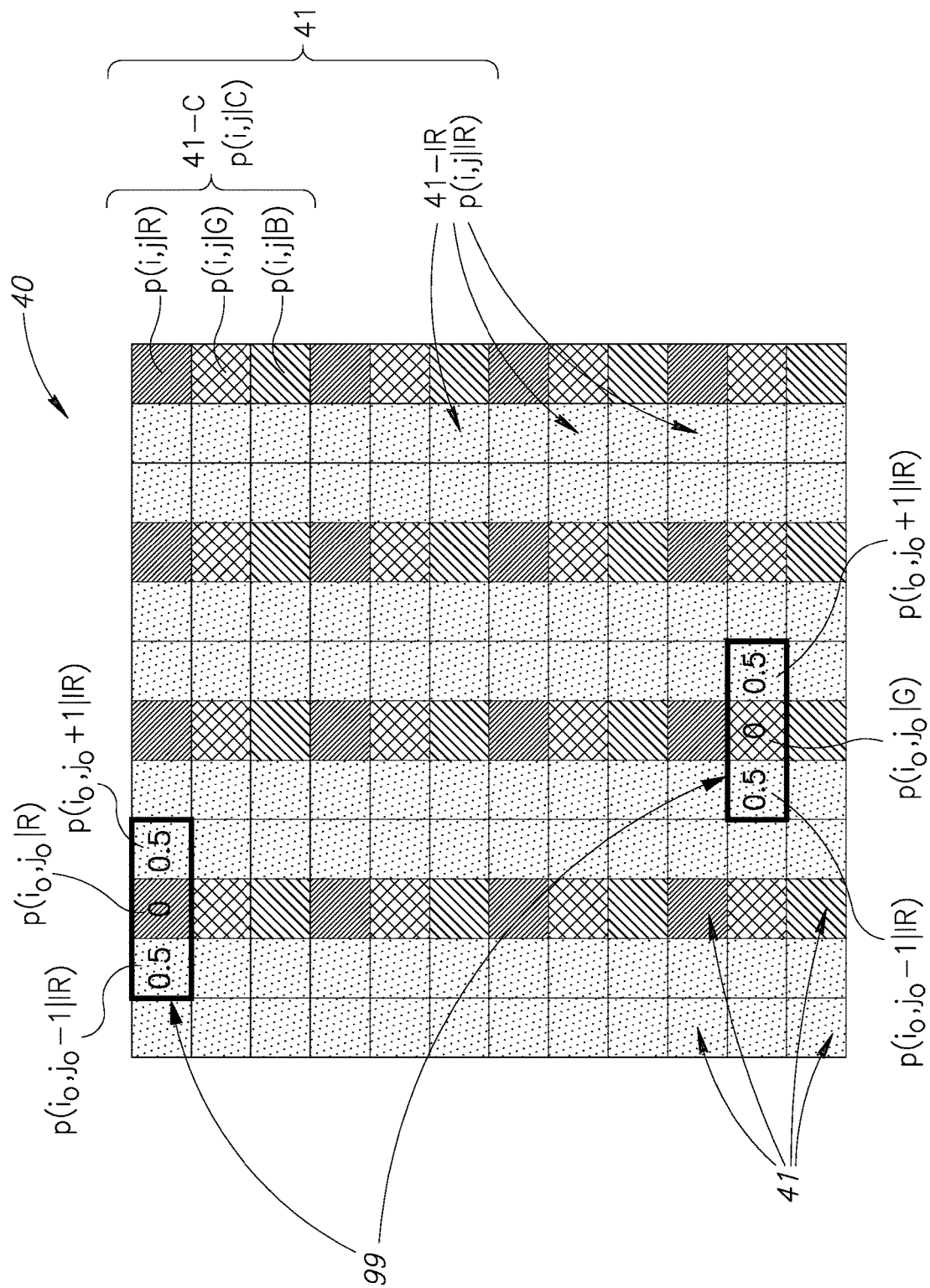
FIG. 2 schematically shows an enlarged view of a portion of a photosensor comprised in the camera having IR and RGB picture pixels, in accordance with an embodiment of the disclosure.

Photosensor 40, a portion of which is shown in an inset 60 in FIG. 1 and greatly enlarged in FIG. 2, is configured to provide CW-TOF camera 20 with data for producing a range image of scene 130 and a color picture image of the scene. The photosensor comprises rows and columns of light sensitive pixels referenced generically as pixels 41. Pixels 41 comprise IR sensitive pixels 41-IR for registering reflected IR light from features in scene 130 and color pixels 41-R, 41-G, and 41-B for registering respectively R, G, and B light from the features. In an embodiment, IR pixels 41-R are shielded by IR bandpass filters (not shown), and R, G, and B pixels 41-R, 41-G, and 41-B are respectively shielded by suitable R, G, and B bandpass filters (not shown). R, G, and B pixels 41-R, 41-G, and 41-B may be referred to generically as color pixels 41-C. Optionally, IR pixels 41-IR and R, G, and B pixels 41-R, 41-G, and 41-B are arranged in pixel blocks 42, having nine pixels per block, each block comprising six IR sensitive pixels 41-IR and three color pixels 41-C. In inset 60 and FIG. 2 pixels schematically shown in photosensor 40 are labeled by generic labels, such as 41, and 41-C, as well as "species distinguishing" labels such as 41-IR, 41-R, 41-G, and 41-B.

A given pixel 41 in photosensor 40 may where reference to spatial location of a pixel is warranted be designated generically, p(i,j), where "i" and "j" are indices that indicate a row and a column respectively of photosensor 40 in which the pixel is located. A given IR pixel 41-IR located in a row i and column j may be designated p(i,j|IR), where "|IR" indicates a constraint that indices i,j are restricted to values that designate a location of an IR pixel. Similarly, a given pixel 41-R, 41-G, and 41-B located in a row i and column j may be designated p(i,j|R), p(i,j|G), and p(i,j|B) respectively, and a color pixel 41-C may generically be designated p(i,j|C). A feature in scene 130 that CW-TOF camera 20 images on a pixel p(i,j) may be referred to as a feature, "f(i,j)", and/or by a reference label. In addition to labels such as 41, 41-C, and 41-R, pixels 41 in photosensor 40 schematically shown FIG. 2 are labeled by labels, such as p(i,j|G), and p(i,j|B) as examples of labels formatted to indicate reference to spatial locations of the pixels in the photosensor as defined by row and column indices i,j.

To acquire a range image of scene 130, controller 54 controls CW-TOF camera 20 to acquire a plurality of K images of scene 130 with IR light that the camera transmits, with each image acquired at a different sampling phase offset $\psi_k$ of a plurality of K sampling phase offsets ($1 \leq k \leq K$), where $\psi_k$ is equal to $2\pi(k-1)/K$, and k and K are integers. For a k-th image of the K images, controller 54 controls oscillator 50 to provide a frequency signal characterized by an angular frequency $\omega_k$ and controls light source 30 to transmit light continuously modulated at the angular frequency $\omega_k$ provided by the oscillator frequency signal. Light transmitted by light source 30 is schematically represented by a wavy line 31 having an arrow indicating direction of propagation of the transmitted light. While illuminating scene 130 with light 31, controller 54 turns on photosensor 40 for an exposure period "$Ex_k$" to register IR light that features in scene 130 reflect from transmitted light 31 back to camera 20 and optical system 21 images on pixels 41-IR of photosensor 40. During the exposure period controller 54 controls photosensor 40 to cross-correlate the light registered by each IR pixel 41-IR with a sampling signal modulated at angular frequency $\omega_k$ provided by oscillator 50, but controls phase shifter 52 to shift the phase of modulation of the sampling signal by a sampling phase offset $\psi_k$ relative to phase of modulation of transmitted light 31. The sampling signal may be considered to modulate sensitivity of IR pixel 41-R during the exposure period, and cross-correlating the reflected IR light with the sampling signal may be referred to as cross-correlating the reflected light with sensitivity of the IR pixel during exposure period $Ex_k$, or cross correlating the reflected light with the exposure period. Optionally, angular frequency $\omega_k$ is the same for all values of k and is hereinafter assumed for convenience of presentation equal to an angular frequency "$\omega$".

A pixel 41 in photosensor 40 registers light reflected from a feature in scene 130 that optical system 21 images on the pixel during exposure period $Ex_k$ by accumulating photocharge that the reflected light generates in the pixel during the exposure period. By way of example, FIG. 1 schematically shows features 133 and 134 of objects 131 and 132 respectively, reflecting IR light from light 31 back to CW-TOF camera 20. Reflected light from feature 133 is schematically represented by a wavy line 33 having an arrow indicating direction of propagation of the light, which optical system 21 images on an IR pixel 41-R, p(i,j|IR) designated pixel 233 in photosensor 40. An amount of photocharge that pixel 233 accumulates is proportional to a cross-correlation of reflected light 33 with the sampling signal modulated at angular frequency $\omega$ for sampling phase offset $\psi_k$. The cross-correlation is a function of the sampling phase offset and a propagation delay $\varphi_d(133)$ resulting from a round trip time $t_R$ for light to travel from light source 30 to feature 133 and back to CW-TOF camera 20. In symbols, $\varphi_d(133) = \omega t_R(133)$, where $t_R(133)$ is a round trip time for light to travel from light source 30 to feature 133 and back to the camera. Since $t_R(133)$ is equal to $2d(133)/c$, where $d(133)$ is the distance from CW-TOF camera 20 to feature 133 and c the speed of light, propagation phase delay $\varphi_d(133)$ is equal to $2\omega d(133)/c$ and may be used to determine $d(133)$. Similarly, reflected light from feature 134 is schematically represented by a wavy line 34 and direction arrow, which is imaged by optical system 21 on a pixel 234, and an amount of photocharge that pixel 234 accumulates for feature 134 during exposure period $Ex_k$ is proportional to a cross-correlation of reflected light 34 with the exposure period. The cross-correlation is a function of sampling phase offset $\psi_k$ and a propagation phase delay $\varphi_d(134)=2\omega d(134)/c$, which because feature 134 is closer to CW-TOF camera 20 is less than $\varphi_d(134)$.

At the end of each exposure period $Ex_k$, controller 54 reads photosensor 40 to acquire a frame of the photosensor for the sampling phase offset $\psi_k$. The frame comprises voltages representing the accumulated photocharges and corresponding amounts of reflected IR light registered by 41-IR pixels p(i,j|IR) in photosensor 40 during exposure period $Ex_k$ for features in scene 130 respectively imaged on the pixels. The frame also comprises voltages representing the accumulated photocharges and corresponding amounts of visible light registered by 41-C color pixels p(i,j|C) in photosensor 40 during exposure period $Ex_k$ for features in scene 130 respectively imaged on the color pixels. Visible light registered by color pixels p(i,j|C) during exposure period $Ex_k$ may comprise light that features imaged on the color pixels reflect from ambient light illuminating scene 130. In an embodiment, controller 54 may control visible light source 30-V to illuminate features in scene 130 during exposure period $Ex_k$ with light 31-V, and the registered visible light may comprise light that the features imaged on the color pixels reflect from visible light 31-V as well as, or in absence of, reflected ambient light.

Controller 54 may process the voltages provided by the frames for all K sampling phase offsets $\psi_k$, $1 \leq k \leq K$ to extract propagation phase delays $\varphi_d(i,j|IR)$ for respective pixels p(i,j|IR) and determine distances d(i,j) for features, f(i,j), imaged on pixels p(i,j|IR) as discussed below.

Transmitted light 31, reflected light, such as light 33 and 34 reflected from transmitted light 31 by features 133 and 134, and modulated sensitivity of pixels in photosensor 40 during an exposure period $Ex_k$ are periodic functions, and each may advantageously be expressed as a Fourier cosine series. Intensity of transmitted light 31 as a function of time during exposure period $Ex_k$ may therefore be represented by $$IR_k(t) = \Sigma_0^\infty IR_{k,n} \cos(n\omega t). \tag{1}$$

Intensity of IR light reflected from light 31 by a feature f(i,j) in scene 130 that is imaged by CW-TOF camera 20 on a given IR pixel p(i,j|IR), for example, pixels 233 and 234, of pixels 23 during exposure period $Ex_k$ may be represented by $$R_k(i,j,\varphi_d(i,j),t|IR) = \Sigma_0^\infty R(i,j|IR)_{k,n} \cos(n\omega t + n\varphi_d(i,j|IR)). \tag{2}$$

If the modulated sensitivity of IR pixels 41-IR in photosensor 40 during exposure period $Ex_k$ is represented by $S_k(t) = \Sigma_0^\infty S_{k,n} \cos(n\omega t + n\psi_k)$, the cross-correlation, $CV_k(i,j|IR) \equiv S_k(t) * R_k(i,j,t|IR)$, of $R_k(i,j,t|IR)$ and $S_k(t)$ for IR pixel p(i,j|IR) may be expressed, $$CV_k(i,j,\varphi_d(i,j),\psi_k|IR)E\ S_k(t)*R_k(i,j,t|IR) = \Sigma_0^\infty S_{k,n} R_{k,n} \cos(n\psi_k + n\varphi_d(i,j|IR)). \tag{3}$$

If $V_k(i,j,\varphi_d(i,j),\psi_k|IR)$ is a voltage representing an amount of "cross-correlated" photocharge accumulated by pixel p(i,j|IR) during exposure period $Ex_k$ in a frame of photosensor 40 acquired following the exposure period, $V_k(i,j,\varphi_d(i,j),\psi_k|IR)$ may be written, $$V_k(i,j,\varphi_d(i,j),\psi_k|IR) = \alpha CV_k(i,j,\varphi_d(i,j),\psi_k|IR) = \alpha \sum_0^\infty S_{k,n} R(i,j|IR)_{k,n} \cos(n\psi_k + n\varphi_d(i,j|IR)), \tag{4}$$

where $\alpha$ is a proportionality coefficient.

For intensity of transmitted light characterized by a single dominant modulation frequency and/or for which harmonics of the dominant frequency may advantageously be ignored, transmitted IR light 31 may be approximated by an expression, $$IR_k(t) = \Sigma_0^\infty IR_{k,n} \cos(n\omega t) \cong I_o + I_1 \cos \omega t, \tag{5}$$

and light from a feature f(i,j) in scene 130 imaged on a pixel p(i,j|IR) advantageously approximated by an expression, $$R_k(i,j,t|IR) = \sum_0^\infty R(i,j|IR)_{k,n} \cos(n\omega t + n\varphi_d(i,j|IR)) \cong R(i,j|IR)_o + R(i,j|IR)_1 \cos(\omega t + \varphi_d(i,j|IR)) \tag{6}$$

Assuming that modulation of sensitivity of photosensor 40 during an exposure period $Ex_k$ may be expressed, $$S_k(t) = \Sigma_0^\infty S_{k,n} \cos(n\omega t + n\psi_k) \cong S_o + S_1 \cos(\omega t + \psi_k), \tag{7}$$

the cross-correlation of exposure period $Ex_k$ and IR light $R_k(i,j,t|IR)$ reflected by a feature f(i,j) in scene 130 and imaged on a pixel 41-IR, p(i,j|IR) becomes, $$CV_k(i,j,\varphi_d(i,j),\psi_k|IR) = S_o R(i,j|IR)_o + S_1 R(i,j|IR)_1 \cos(\psi_k + \varphi_d(i,j|IR)). \tag{8}$$

Voltage representing the photocharge accumulated by p(i,j|IR) during the exposure period, $$V_k(i,j,\varphi_d(i,j),\psi_k|IR) = \alpha CV_k(i,j,\varphi_d(i,j),\psi_k|IR) = \alpha[S_o R(i,j|IR)_o + S_1 R(i,j|IR)_1 \cos(\psi_k + \varphi_d(i,j|IR))], \tag{9}$$

which may be written in a form, $$V_k(i,j,\varphi_d(i,j),\psi_k|IR) = A(i,j|IR) + B(i,j|IR)\cos(\psi_k + \varphi_d(i,j|IR)). \tag{10}$$

The term A(i,j|IR) in expression (10) results from the DC components $I_o$ and $R(i,j|IR)_o$ of transmitted and reflected light $IR_k(t)$ and $R_k(i,j,t|IR)$ respectively, as well as from ambient IR light and visible light that the IR bandpass filter shielding IR pixel p(i,j|IR) fails to block. A(i,j|IR) is substantially independent of modulation frequency $\omega$, sampling phase offset $\psi_k$, and propagation phase delay $\varphi_d(i,j|IR)$. A(i,j|IR) is predominantly a function of reflectivity of feature f(i,j) imaged on pixel p(i,j|IR) and a solid angle that the feature subtends at CW-TOF camera 20. Since, for a given feature f(i,j) and pixel p(i,j|IR) on which CV-TOF came 20 images reflected IR light from the given feature, A(i,j|IR) is substantially the same for all $\psi_k$ and $\varphi_d(i,j|IR)$, A(i,j|IR) is often referred to as a "common mode" of the voltage signals $V_k(i,j,\varphi_d(i,j),\psi_k|IR)$ that pixel p(i,j|IR) generates for feature f(i,j). The term B(i,j|IR), which is also dependent on reflectivity and solid angle of feature f(i,j) and substantially the same for all $\psi_k$, is however dependent on propagation phase delay $\varphi_d(i,j|IR)$ as well as and modulation frequency and sensitivity. B(i,j|IR) multiplies the harmonic function cos ($\psi_k+\varphi_d(i,j|IR)$) which is explicitly dependent on $\varphi_d(i,j|IR)$, and is often referred to as an "active brightness" of voltage signals $V_k(i,j,\varphi d(i,j),\psi_k|IR)$.

Controller 54 may determine propagation phase delay $\varphi_d(i,j|IR)$ for a feature $f(i,j|IR)$ imaged on pixel $p(i,j|IR)$ in accordance with an expression, $$\varphi_d(i,j|IR) = \operatorname{atan}\left[-\sum_{k=1}^{k=K} V_k(i,j,\varphi_d(i,j),\psi_k|IR) \sin(\psi_k) / \sum_{k=1}^{k=K} V_k(i,j,\varphi_d(i,j),\psi_k|IR)\cos(\psi_k)\right] = \operatorname{atan}\left[-\frac{\sum_{k=1}^{k=K} B(i,j|IR)\cos(\psi_k + \varphi_d(i,j|IR))\sin(\psi_k)}{(\sum_{k=1}^{k=K})B(i,j)\cos(\psi_k\varphi_d(i,j|IR))\cos(\psi_k)}\right] \quad (11)$$

and distance $d(i,j|IR)$ to feature $f(i,j|IR)$ in accordance with, $$d(i,j)=[c/2\omega]\varphi_d(i,j|IR). \quad (12)$$

The controller may determine $A(i,j|IR)$ and $B(i,j|IR)$ in accordance with expressions $$A(i,j|IR)=(1/K)\Sigma_k V_k(i,j,\varphi_d(i,j),\psi k|IR), \quad (13)$$

and $$B(i,j|IR)=(2/K)[(\Sigma_k V_k(i,j,\varphi_d(i,j),\psi_k|IR)\sin\psi_k)^2+(\Sigma_k V_k(i,j,\varphi_d(i,j),\psi_k|IR)\cos\psi_k)^2]^{1/2} \quad (14)$$

By way of specific example, for feature 133 of object 33 that CW-TOF camera 20 images on pixel 233, controller 54 may determine a propagation phase delay $$\varphi_d(233), a\tan[-\Sigma_{k=1}^{k=K}V_k(233,\varphi_d(233),\psi_k)\sin(\psi_k)/\Sigma_{k=1}^{k=K}V_k(233,\varphi_d(233),\psi_k)\cos(\psi_k)], \quad (14)$$

and distance to the feature, $$d(133)=[c/2\omega]\varphi_d(233). \quad (15)$$

In an embodiment, as noted above, during each exposure period $Ex_k$ for which IR pixels $p(i,j|IR)$ register IR light from features in scene 130, color pixels $p(i,j|R)$, $p(i,j|G)$, and $p(i,j|B)$ respectively register R, G, and B light reflected from ambient light and/or optionally visible light 31-V transmitted by visible light source 30-V back to CW-TOF camera 20 by features in the scene. A frame of photosensor 40 acquired by CW-TOF camera 20 following an exposure period $Ex_k$ therefore comprises in addition to voltages generated by IR pixels 41-IR, also voltages generated by color pixels $p(i,j|R)$, $p(i,j|G)$, and $p(i,j|B)$ responsive to R, G, and B light from scene 130. However, since the ambient light is not modulated by modulation function $S_k(t)$, voltages generated by RGB pixels $p(i,j|R)$, $p(i,j|G)$, and $p(i,j|B)$ responsive respectively to R, G, and B light incident on the pixels during exposure period $Ex_k$ are substantially independent of modulation frequency $\omega$, sampling phase offset $\psi_k$, and propagation phase delay $\varphi_d(i,j|IR)$. The voltages, which may be referred to as "color voltages" represented by $V_k(i,j|R)$, $V_k(i,j|G)$, and $V_k(i,j|B)$, are predominantly dependent, in addition to intensity of ambient light, on reflectivity and subtended solid angle of the features $f(i,j)$ that the pixels respectively image. In an embodiment for each color pixel $p(i,j|R)$, $p(i,j|G)$, and $p(i,j|B)$, controller 54 determines an average, $V(i,j|R)$, $V(i,j|G)$, and $V(i,j|B)$ respectively of the color voltages that the color pixel generates for the K exposure periods $Ex_k$ ($1 \le k \le K$). Controller 54 may use the average as a representative color voltage indicative of intensity of R, G, or B light respectively incident on the color pixel. In symbols, $$\left.\begin{array}{l}V(i,j|R) = (1/K)\sum_k V_k(i,j|R); \\ V(i,j|G) = (1/K)\sum_k V_k(i,j|G); \text{ and} \\ V(i,j|B) = (1/K)\sum_k V_k(i,j|B).\end{array}\right\} \quad (16)$$

Whereas a frame of photosensor 40 comprises voltages responsive to reflected IR light from which to determine a range image of scene 130 and voltages responsive to visual R, G, B light from which to determine a color picture of the scene, the respective bandpass filters that shield the pixels substantially reduce sensitivity of color pixels 41-C to IR light and IR pixels 41-IR to visible light. A frame, hereinafter also referred to as a "native frame", of photosensor 40 acquired for an exposure period $Ex_k$ is therefore spatially inhomogeneous as a function of pixel indices i,j for both IR voltages from which to provide a range image of scene 130 and color voltages from which to provide a color picture of scene 130. In a native frame, IR distance information provided by IR voltages for scene 130 is missing or vitiated for row and column indices i,j at which color pixels $p(i,j|C)$ (C=R, G, or B) are located and color information may be missing or vitiated for the scene for indices i,j at which IR pixels $p(i,j|IR)$ are located. As a result, both a range image and a color picture of the scene generated from native frames of photosensor 30 may be inhomogeneous. At locations in the range image corresponding to color pixels $p(i,j|C)$ distances are or vitiated and at locations in the color picture corresponding to IR pixels $p(i,j|IR)$ color intensities are missing or vitiated.

In an embodiment, to provide a spatially homogeneous IR frame of photosensor 40 for an exposure period $Ex_k$ for which each pixel location i,j in the frame is associated with an IR voltage from which to provide a range image of scene 130, controller 54 processes IR voltages provided by IR pixels $p(i,j|IR)$ in a native frame of photosensor 40 for $Ex_k$ to assign an IR voltage to each color pixel $p(i,j|C)$ in the photosensor. The homogeneous IR frame comprises the IR native voltages $V_k(i,j,\varphi_d(i,j),\psi_k|IR)$ from the native frame provided by 41-IR pixels $p(i,j|IR)$ and the IR voltages assigned to the color pixels $p(i,j|C)$.

Let an IR voltage assigned to a given color pixel 41-C, $p(i_o,j_o|C)$ at row and column $i_o,j_o$ for exposure period $Ex_k$ be represented by $V^*_k(i_o,j_o|C/IR)$ where the asterisk indicates that the voltage is an assigned voltage and not a native voltage, and the argument C/IR indicates that the assigned voltage is an IR voltage assigned to a C color pixel. In an embodiment, controller 54 determines $V^*_k(i_o,j_o|C/IR)$ as an average of "native" IR voltages $V_k(i,j,\varphi_d(i,j),\psi_k|IR)$ in the native frame provided by IR pixels $p(i,j|IR)$ in a neighborhood of $p(i_o,j_o|C)$. To provide the average, the controller may apply a spatial image kernel, "$\mathcal{K} i_o,j_o,i,j|C/IR)$", for location $i_o,j_o$ to the native frame of voltages. In symbols, $$V^*_k(i_o,j_o|C/IR)=\Sigma_{i,j}\mathcal{K} i_o,j_o,i,j|C/IR)\cdot V_k(i,j,\varphi_d(i,j),\psi_k|IR). \quad (17)$$

In an embodiment, $\mathcal{K} i_o,j_o,i,j|C/IR)$, may by way of example, be a rectangular kernel, one pixel row wide and three pixel columns long having weights [0.5, 0, 0.5]. $\mathcal{K}(i_o,j_o,i,j)$ operates on IR pixels $p(i,j|IR)$ adjacent to color pixel $p(i_o,j_o|C)$ in a same row $i_o$ as color pixel $p(i_o,j_o|C)$ and returns an assigned IR voltage $V^*_k(i_o,j_o|C/IR)$ for the color pixel given by $$V^*_k(i_o,j_o|C/IR) = 0.5 V_k(i_o,j_o-1,\varphi_d(i,j),\psi_k|IR) + 0.5 V_k(i_o,j_o+1,\varphi_d(i,j),\psi_k|IR) \quad (18)$$

Whereas the above kernel $\mathcal{K}(i_o,j_o,i,j|C/IR)$ is described as operating on IR voltages $V_k(i,j,\varphi_d(i,j),\psi_k|IR)$ comprised in native frames associated with particular sampling phase offsets $\psi_k$, the kernel may be used to operate on components of the voltages, for example, the common mode term $A(i,j|IR)$, or the active brightness coefficient $B(i,j|IR)$ as, optionally given by expressions (13) and (14). For example, $\mathcal{K}(i_o,j_o,i,j|C/IR)$ may operate to assign a common mode term and/or an active brightness coefficient to a color pixel $p(i_o,j_o|C)$ based on voltages provided by 41-IR pixels $p(i,j|IR)$ in accordance with expressions:

$$A^*(i_o, j_o | C/IR) = \sum_{i,j} \mathcal{K}(i_o, j_o, i, j | C/IR) \cdot A(i, j | IR)$$
$$B^*(i_o, j_o | C/IR) = \sum_{i,j} \mathcal{K}(i_o, j_o, i, j | C/IR) \cdot B(i, j | IR) \quad (19)$$

To graphically illustrate how controller 54 may use kernel $\mathcal{K}(i_o,j_o,i,j|C/IR)$ to process voltages in a native frame of photosensor 40, let the image of the photosensor shown in FIG. 2 schematically represent a native frame of the photosensor so that a pixel $p(i,j)$ in the image located at row and column i,j of the photosensor also represents a native voltage that the pixel provides for the frame. In the figure, kernel $\mathcal{K}(i_o,j_o,i,j|C/IR)$ designated by the label 99 is shown by way of example, centered on a 41-R "red" color pixel $p(i_o,j_o|R)$ to schematically indicate operation of $\mathcal{K}(i_o,j_o,i,j|C/IR)$ in determining for $p(i_o,j_o|R)$ an assigned IR-voltage $V^*_k(i_o,j_o|R/IR)$ in accordance with expression (18), or $A^*(i_o,j_o|C/IR)$ and/or $B^*(i_o,j_o|C/IR)$ in accordance with expression (19). Similarly, kernel $\mathcal{K}(i_o,j_o,i,j|C/IR)$ 99 is schematically shown centered on a 41-G, green color pixel, $p(i_o,j_o|G)$, of photosensor 40 to graphically indicate operation of $\mathcal{K}(i_o,j_o,i,j|C/IR)$ in determining an assigned IR-voltage, $A^*(i_o,j_o|C/IR)$ and/or $B^*(i_o,j_o|C/IR)$ for $p(i_o,j_o|G)$.

It is noted that kernel $\mathcal{K}(i_o,j_o,i,j|C/IR)$ returns a simple average in which each value contributing to the average is weighted equally. However practice of embodiments of the disclosure is not limited to simple averages, and a kernel $\mathcal{K}(i_o,j_o,i,j|C/IR)$ may return a weighted average in which at least two values contributing to the average are weighted differently.

In an embodiment, controller 54 processes IR, R, G, and B voltages in native frames of photosensor 40 provided by pixels 41 $p(i,j)$ to provide a homogeneous color frame of voltages for each color R, G, and B. In an embodiment each pixel location, i,j, of an R, G, or B frame is respectively assigned an R, G, and B color voltage representing R, G, and B intensity for use in providing a color picture of scene 130. The controller processes the IR, R, G, and B voltages to assign each 41-IR pixel $p(i,j|IR)$ with R, G, and B voltages, and each R pixel, $p(i,j|R)$, which by itself provides a "native" R voltage representing intensity of R light that the pixel registers, G and B voltages representing G and B intensities. Similarly, the controller processes the voltages to associate R and B voltages to each 41-G pixel $p(i,j|G)$, and R and G voltages to each 41-B pixel $p(i,j|B)$. The native and associated voltages for each color, R, G, and B provide a homogenous frame of color voltages for the color.

In an embodiment, to assign the color voltages, controller 54 processes native frames acquired for exposure periods $Ex_k$ ($1 \leq k \leq K$) to determine values for common mode terms $A(i,j|IR)$ and/or active brightness coefficients $B(i,j|IR)$ for 41-IR pixels $p(i,j|IR)$, optionally in accordance with expressions (13) and (14), and assign 41-C color pixels $p(i,j|C)$ with respective values for $A^*(i,j|C/IR)$ and/or $B^*(i,j|C/IR)$ in accordance with expression (19). Controller 54 may process native frames to determine values for representative color voltages $V(i,j|R)$, $V(i,j|G)$, and $V(i,j|B)$, optionally in accordance with expressions (16) for color pixels $p(i,j|R)$, $p(i,j|G)$, and $p(i,j|B)$. For each color pixel $p(i,j|C)$ in photosensor 40 the controller may process determined representative color values and native and assigned common mode terms and/or active brightness coefficients, using a set of optionally three nested kernels to assign color voltages to pixels $p(i,j)$ in photosensor 40 so that each pixel $p(i,j)$ in photosensor 40 is associated with an R, a B and a G color voltage.

For a given color pixel $p(i_o,j_o|C)$, at location $i_o,j_o$, the set of kernels may comprise a first, IR processing kernel $\mathcal{K}_{IR}(i_o,j_o,i,j)$, that generates an average, $MV(IR,i_o,j_o)$, of a function of the common mode $A(i,j|IR)$ and/or the active brightness $B(i,j|IR)$ of all IR pixels $p(i,j|IR)$ in an IR processing neighborhood of the given color pixel $p(i_o,j_o|C)$. The average may be a simple average in which each value contributing to the average is weighted equally or a weighted average in which at least two values contributing to the average are weighted differently. Optionally, $MV(IR,i_o,j_o)$ is a simple average of the $A(i,j|IR)$ and may be determined $$MV(IR,i_o,j_o) = \Sigma_{i,j|IR} \mathcal{K}_{IR}(i_o,j_o,i,k) \cdot A(i,j|IR), \quad (20)$$

where the sum is over indices for 41-IR pixels $p(i,j|IR)$ in the processing neighborhood of $p(i_o,j_o|C)$.

The set of kernels may comprise a second, color processing kernel $\mathcal{K}_C(i_o,j_o,i,j)$, that generates a simple or weighted average, $MV(C,i_o,j_o)$, of representative color voltages $V(i,j|C)$ provided by color pixels $p(i,j|C)$ of the same color, C, as the given color pixel $p(i_o,j_o|C)$ in a color processing neighborhood of $p(i_o,j_o|C)$. For example, if C=R then $\mathcal{K}_C(i_o,j_o,i,j)$ generates an average $M(R,i_o,j_o)$ of representative voltages $V(i,j|R)$ provided by all 41-R color pixels $p(i,j|R)$ in a color processing neighborhood of $p(i_o,j_o|R)$ responsive to R light incident on the pixels. In symbols, optionally $$MV(C,i_o,j_o) = \Sigma_{i,j|C} \mathcal{K}_C(i_o,j_o,i,j) \cdot V(i,j|C), \quad (21)$$

where the sum is over indices for 41-C color pixels $p(i,j|C)$ in the color processing neighborhood of $p(i_o,j_o|C)$.

The set of kernels may comprise an assignment kernel, $\mathcal{K}_A(i_o,j_o)$, that assigns color voltages to pixels $p(i,j)$ respectively in an assignment neighborhood of $p(i_o,j_o|C)$ that does not include a 41-C color pixel other than $p(i_o,j_o|C)$. $\mathcal{K}_A(i_o,j_o)$ may assign pixel $p(i_o,j_o|C)$ the native representative color voltage $V(i_o,j_o|C)$ that $p(i_o,j_o|C)$ itself generates. In an embodiment, for 41-IR pixels $p(i,j|IR)$ in the assignment neighborhood of $p(i_o,j_o|C)$, the $\mathcal{K}_A(i_o,j_o)$ assigns respective color voltages $V^*(i,j|IR/C,i_o,j_o)$, where the asterisk indicates that the color voltage is an assigned color voltage and the argument $IR/C,i_o,j_o$ indicates that the assigned color voltage is a C color voltage assigned to a 41-IR pixel $p(i,j|IR)$ responsive to location $i_o,j_o$ in photosensor 40. $V^*(i,j|IR/C,i_o,j_o)$ may be determined in accordance with an expression $$V^*(i,j|IR/C,i_o,j_o) = [MV(C,i_o,j_o)/MV(IR,i_o,j_o)]A(i,j|IR). \quad (22)$$

For color pixels p(i,j|C'≠C) the assignment kernel, $\mathscr{K}_A$ ($i_o$, $j_o$) may assigns color voltages $$V^*(i,j|C'/C,i_o,j_o) = [MV(C,i_o,j_o)/MV(IR,i_o,j_o)]A^*(i,j|C'/AR). \quad (23)$$

In expression (23) $A^*(i,j|C'/IR)$ is a common mode term assigned to color pixel p(i,j|C'), optionally a discussed above in accordance with expressions (17) and (18) and illustration of operation of kernel $\mathscr{K}$ ($i_o,j_o,i,j|C/IR$) in FIG. 2. The factor $[MV(C,i_o,j_o)/MV(IR,i_o,j_o)]$ in expressions (22) and (23) may be referred to as a "scaling factor" and be represented by $SF(C,i_o,j_o)$.

Whereas in expressions (22) and (23) scaling factor $SF(C,i_o,j_o)$ is indicated as being the same for any color C=R, G, or B, practice of an embodiment of the disclosure is not limited to a color agnostic scaling factor. A scaling factor in accordance with an embodiment of the disclosure may be different for different colors. For example, a scaling factor $SF(R,i_o,j_o)$ for R light may be different from a scaling factor $SF(B,i_o,j_o)$ for B light to account for different correlations between IR and R reflectivity of features in a scene and IR and B reflectivity of the features.

Figure 3:
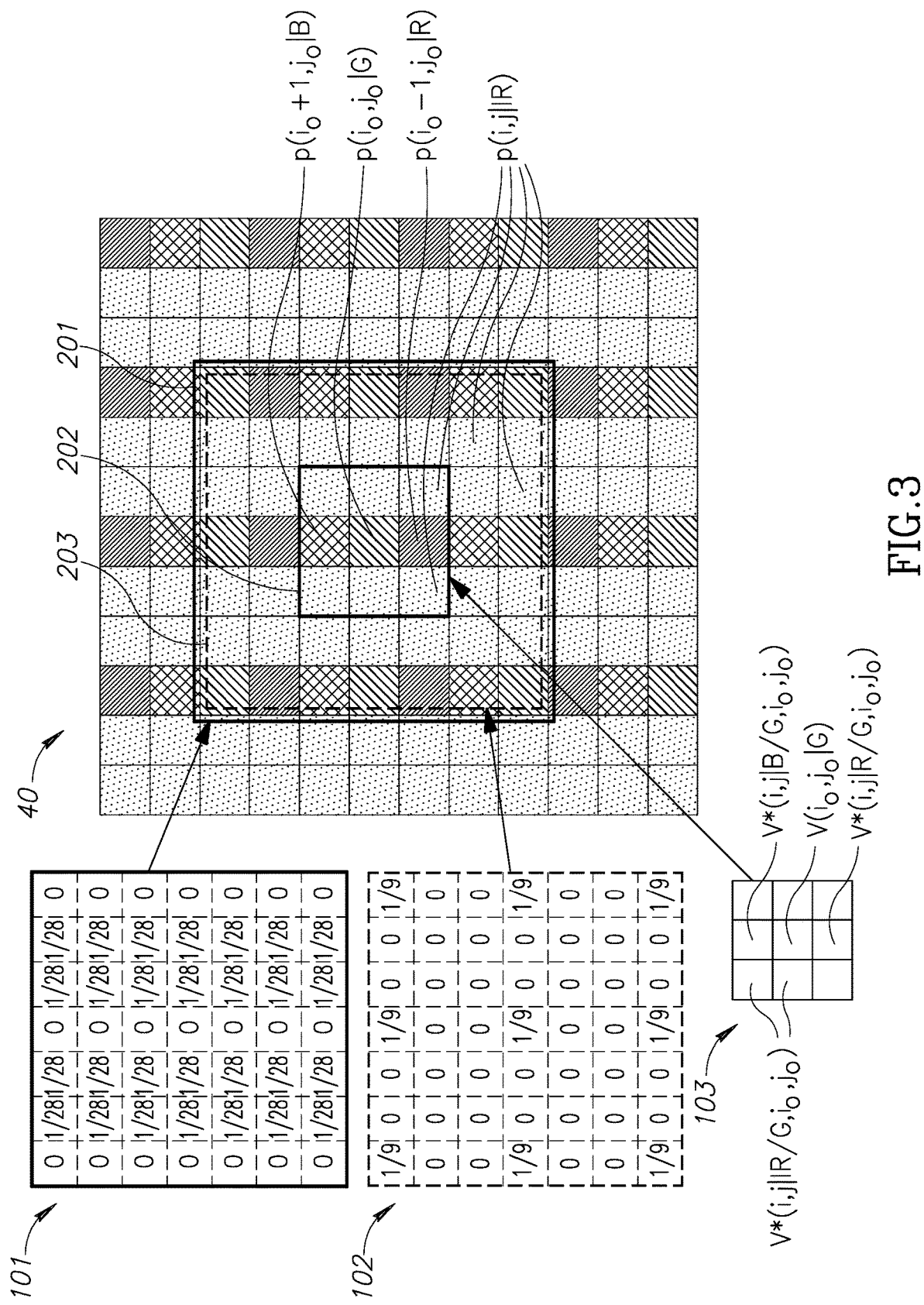
FIG. 3 schematically illustrates using image processing kernels to implement generating a full resolution picture image of a scene in accordance with an embodiment of the disclosure.

FIG. 3 schematically shows $\mathscr{K}_{IR}$ ($i_o,j_o,i,j$), $\mathscr{K}_C$ ($i_o,j_o,i,j$), and $\mathscr{K}_A$ ($i_o,j_o,i,j$) kernels, 101, 102, and 103 respectively, for processing data based on voltages generated by photosensor 40 to provide homogeneous color frames of voltages for each R, G, and B color, in accordance with an embodiment of the disclosure. The kernels may operate to assign an R, G, and B color voltage to each pixel p(i,j) in photosensor 40 on which a feature f(i,j) of scene 130 is imaged that represents intensity of R, G, and B light incident on the pixel from the feature.

In an embodiment, kernels 101, 102, and 103 are square, and for each color pixel p(i,j|C) in photosensor 40 operate on data provided by pixels p(i,j) in respective IR, color, and assignment processing neighborhoods indicated by respective perimeters 201, 202, and 203 in photosensor 40 that are centered on the color pixel. Optionally, assignment neighborhood 203 has a size of a pixel block 60 (FIG. 1) and includes nine pixels, of which six are 41-IR pixels p(i,j|IR) and three are R, G, and B color pixels p(i,j IR), p(i,j|G), and p(i,j|B). In an embodiment, IR processing neighborhood 201 and color processing neighborhood 202 are congruent and have a size equal to that of nine pixel blocks 60. Kernels 101, 102, and 103 operate to assign the color of the color pixel p(i,j|C) to pixels p(i,j) in the assignment neighborhood 203 of assignment kernel 103. By way of example, in FIG. 3 kernels 101, 102 and 103 are indicated as operating in neighborhoods 201, 202, and 203 of a 41-G color pixel p($i_o,j_o$|G) to assign a G color voltage to each pixel p(i,j) in the assignment neighborhood.

In an embodiment, $\mathscr{K}_{IR}$ ($i_o,j_o,i,j$) kernel 101, which generates MV(IR,$i_o,j_o$) in accordance with expression (20), is configured to determine a simple average of the common mode terms A(i,j|IR) associated with 41-IR pixels p(i,j|IR) in IR processing neighborhood 201 for MV(IR,$i_o,j_o$). Weights in cells of $\mathscr{K}_{IR}$ ($i_o,j_o,i,j$) 101 that are homologous with 41-IR pixels p(i,j|IR) in processing neighborhood 101 therefore have a same value 1/28. Weights in cells of $\mathscr{K}_{IR}$ ($i_o,j_o,i,j$) homologous with 41-C color pixels p(i,j|C) in processing neighborhood 101, which do not contribute to MV(IR,$i_o,j_o$), are equal to zero.

$\mathscr{K}_C$ ($i_o,j_o,i,j$) kernel 102 which generates MV(C,$i_o,j_o$) in accordance with expression (21) may be configured to determine a simple average of the color voltages V(i,j|G) associated with 41-G pixels p(i,j|G) in color processing neighborhood 202 for MV(G,$i_o,j_o$). Weights in cells of $\mathscr{K}_C$ ($i_o,j_o,i,j$) 102 that are homologous with 41-G color pixels p(i,j|G) in processing neighborhood 102 therefore have a same value 1/9. Weights in cells of $\mathscr{K}_C$ ($i_o,j_o,i,j$) homologous with 41-IR pixels p(i,j|IR), 41-R pixels p(i,j|R) or 41-B pixels p(i,j|B) in processing neighborhood 202, which do not contribute to MV(G,$i_o,j_o$), are equal to zero.

$\mathscr{K}_C$ ($i_o,j_o,i,j$) kernel 103, which assigns color voltages to pixels in assignment neighborhood 203, may determine or comprise in each of its cells a color voltage which kernel 103 assigns to a pixel in neighborhood 203 that is homologous with the cell. A center cell in the kernel is homologous with 41-G green color pixel p($i_o,j_o$|G) and assigns the native representative color voltage V($i_o,j_o$|G) that p($i_o,j_o$|G) itself generates to p($i_o,j_o$|G). Kernel 103 assigns G color voltage $V^*(i_o+1,j_o|R/G,i_o,j_o)$ in accordance with expression (23) to 41-R, red color pixel p($i_o+1,j_o$|R) one row above pixel p($i_o,j_o$|G). Similarly, kernel 103 assigns G color voltage $V^*(i_o-1,j_o|B/G,i_o,j_o)$ to blue color pixel p($i_o-1,j_o$|B) one row below pixel p($i_o,j_o$|G). The kernel assigns voltages $V^*$(i, j|IR/C,$i_o,j_o$) in accordance with expression (22) to respective 41-IR pixels p(i,j|IR) in assignment neighborhood 203.

The above detailed description discusses a CW-TOF camera in accordance with an embodiment of the disclosure that provides both a range image and a color picture of a scene. However, practice of an embodiment of the disclosure is not limited to CW-TOF range cameras, or to color pictures of scenes for which a CW-TOF range camera provides a range image. A gated time of flight, GT-TOF, range camera in accordance with an embodiment may comprise a photosensor, optionally similar to photosensor 40, having both IR pixels and visible light picture pixels. The GT-TOF camera may comprise a controller similar to controller 54 that controls a light source similar to light source 30 to transmit a train of IR light pulses to illuminate a scene that the range camera images and gate ON the photosensor for a corresponding series of exposure periods to provide a range image. The GT-TOF range camera may process IR and color voltages that the photosensor provides similarly to the way in which controller 54 processes IR and color voltages to provide both range and color picture images. Furthermore, both a CW-TOF or a GT-TOF range camera in accordance with an embodiment may comprise a photosensor having in addition to IR "range" pixels, monochrome picture pixels in place of, or in addition to, color picture pixels. The range camera may process IR and monochrome voltages that the photosensor generates to provide a range image and a monochrome picture of a scene similarly to the way in which CW-TOF camera 20 processes IR and color voltages to provide range and color images of a scene. It is also noted that practice of embodiments of the disclosure is not limited to photosensors for which pixels are configured in blocks comprising six non-visible (NV), optionally IR light, and three visible light pixels. For example, a TOF range camera in accordance with an embodiment may have a photosensor comprising blocks of four pixels comprising three IR and one visible light pixel, three visible light pixels and one IR pixel, or two IR and two visible light pixels.

It is further noted that visible light picture pixels in a photosensor of a TOF range camera in accordance with an embodiment may be configured to function as TOF range pixels. For example, in an embodiment a given picture pixel of a photosensor may not be protected by an IR bandpass filter or may be protected by a visible light bandpass filter having an IR transmission band, and may be controllable to have sensitivity modulated and phase shifted similarly to the manner in which IR range pixels, such as IR range pixel 41-IR, are controllable. Voltages provided by the given picture pixel responsive to light may be processed to provide a common mode term that is a function of DC components of reflected IR and visible light, and an active brightness coefficient and propagation phase delay that are functions of round trip flight time τR.

And in an embodiment, a camera comprising a photosensor, optionally similar to photosensor 40, having both NV pixels and visible light picture pixels, may be configured to provide a visible light picture and an NV light picture, that is an NV contrast image, of a scene. For example, in an embodiment controller 54 of CW-TOF camera 20 may be configured to control light sources 30 and 30-V to illuminate scene 130 with IR and visible light that is not modulated. The controller may process voltages generated by photosensor 40 responsive to light reflected by features in the scene from the light from lights sources 30 and 30-V similarly to the way the controller processes common mode terms provided by IR pixels 41-IR and voltages provided by color pixels 41-C to provide a color picture and an IR contrast picture of scene 130. Optionally, the controller does not control IR light source 3 to illuminate scene 130 with IR light and the IR picture image is a thermal image of the scene generated responsive to IR radiation emitted by objects in the scene.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A range camera operable to provide a range image of a scene and a picture of the scene, the range camera comprising:
   a light source operable to transmit non-visible (NV) light to illuminate the scene;
   a photosensor having a plurality of NV pixels configured to register NV light reflected by features in the scene from the transmitted NV light, and a plurality of picture pixels configured to register visible light reflected by the features; and
   a controller configured to:
      determine pictures of features in the scene imaged on the picture pixels based on the visible light that the picture pixels register:
      assign intensities of visible light to each of the plurality of NV pixels based on the NV light registered by the NV pixel and the visible light registered by a picture pixel of the plurality of picture pixels; and
      provide a picture of the scene based on the visible light registered by the picture pixels and the intensities of visible light assigned to the NV pixels.

2. The range camera according to claim 1 wherein assigning intensities of visible light comprises determining an NV function of the NV light registered by an NV pixel, and determining a first average that is an average of the NV functions for NV pixels of the plurality of NV pixels in a first neighborhood of a given picture pixel that registers visible light in a given band of visible light.

3. The range camera according to claim 2 wherein the first average is a simple average.

4. The range camera according to claim 2 wherein the first average is a weighted average.

5. The range camera according to claim 2 wherein assigning intensities comprises determining a second average that is an average intensity of visible light registered by picture pixels of the plurality of picture pixels in a second neighborhood of the given picture pixel that registers light in the given band of visible light.

6. The range camera according to claim 5 wherein the second average is a simple average.

7. The range camera according to claim 5 wherein the second average is a weighted average.

8. The range camera according to claim 5 wherein the second neighborhood is congruent with the first neighborhood.

9. A range camera operable to provide a range image of a scene and a picture of the scene, the range camera comprising:
   a light source operable to transmit non-visible (NV) light to illuminate the scene;
   a photosensor having a plurality of NV pixels configured to register NV light reflected by features in the scene from the transmitted NV light, and a plurality of picture pixels configured to register visible light reflected by the features; and
   a processor configured to:
      determine pictures of features in the scene imaged on the picture pixels based on the visible light that the picture pixels register:
      assign intensities of visible light to each of the plurality of NV pixels based on the NV light registered by the NV pixel and the visible light registered by a picture pixel of the plurality of picture pixels, wherein assigning intensities comprises determining a scaling factor equal to a function of a ratio of a second average that is an average intensity of visible light registered by picture pixels of the plurality of picture pixels divided by a first average that is an average of NV functions for NV pixels of the plurality of NV pixels; and
      provide a picture of the scene based on the visible light registered by the picture pixels and the intensities of visible light assigned to the NV pixels.

10. The range camera according to claim 5 wherein assigning intensities comprises:
   determining a scaling factor equal to a function of a ratio of the second average divided by the first average; and
   assigning to each NV pixel in a third neighborhood of the given picture pixel an intensity of light for the given band of visible light equal to a product of the scaling factor and a value of the NV function for the NV pixel.

11. The range camera according to claim 10 wherein the third neighborhood comprises at least one picture pixel that registers light in a visible light band different from the given band of visible light.

12. The range camera according to claim 11 wherein assigning intensities comprises assigning a value of the NV function to each of the at least one picture pixel that registers light in the different visible light band.

13. The range camera according to claim 12 wherein the assigned value of the NV function is an average of values of NV functions.

14. The range camera according to claim 12 wherein assigning intensities comprises assigning to each of the at least one picture pixel that registers light in the different visible light band an intensity of light for the given band of visible light equal to a product of the scaling factor and the assigned value of the NV function for the picture pixel that registers light in the different visible light band.

15. The range camera according to claim 11 wherein the at least one picture pixel that registers light in the different visible light band comprises at least one or any combination more than one pixel that registers light in a red, a green, or a blue light band.

16. The range camera according to claim 11 wherein the at least one picture pixel that registers light in the different visible light band comprises at least one or any combination more than one pixel that registers light in a red, a green, or a blue light band.

17. The range camera according to claim 2 wherein the range camera comprises a continuous wave CW-TOF range camera.

18. The range camera according to claim 17 wherein the NV function is a function of a common mode term and/or active brightness coefficient associated with NV light registered by an NV pixel of the plurality of NV pixels.

19. The range camera according to claim 1 wherein the range camera comprises a gated GT-TOF range camera.

20. A method of providing a range image and a picture of a scene, the method comprising:
- transmitting non-visible (NV) light to illuminate the scene;
- registering light from features in the scene on a photosensor having a plurality of NV pixels configured to register NV light reflected by the features from the transmitted NV light, and a plurality of picture pixels configured to register visible light reflected by the features;
- determining distances to features in the scene imaged on NV pixels based on the NV light registered by the NV pixels;
- determining pictures of features in the scene imaged on the picture pixels based on visible light that the picture pixels register:
- assigning intensities of visible light to each of the plurality of NV pixels based on the NV light registered by the NV pixel and the visible light registered by a picture pixel of the plurality of picture pixels; and
- providing a picture of the scene based on the visible light registered by the picture pixels and the intensities of visible light assigned to the NV pixels.

* * * * *